United States Patent
Mimura et al.

(10) Patent No.: US 12,218,336 B2
(45) Date of Patent: Feb. 4, 2025

(54) METHOD FOR PRODUCING ELECTRODE

(71) Applicants: Prime Planet Energy & Solutions, Inc., Tokyo (JP); TOYOTA JIDOSHA KABUSHIKI KAISHA, Aichi-ken (JP)

(72) Inventors: Tetsuya Mimura, Chiryu (JP); Katsushi Enokihara, Toyota (JP); Masanori Kitayoshi, Toyota (JP); Kouji Yamashiro, Miyoshi (JP)

(73) Assignees: PRIME PLANET ENERGY & SOLUTIONS, INC., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 240 days.

(21) Appl. No.: 17/680,315

(22) Filed: Feb. 25, 2022

(65) Prior Publication Data

US 2022/0278307 A1    Sep. 1, 2022

(30) Foreign Application Priority Data

Mar. 1, 2021 (JP) .................. 2021-031991

(51) Int. Cl.
*H01M 4/04* (2006.01)
*H01M 10/0525* (2010.01)

(52) U.S. Cl.
CPC ....... *H01M 4/0435* (2013.01); *H01M 4/0404* (2013.01); *H01M 10/0525* (2013.01)

(58) Field of Classification Search
CPC ............. H01M 4/0435; H01M 4/0404; H01M 10/0525; H01M 4/139; Y02E 60/10; G01B 21/08
See application file for complete search history.

(56) References Cited

U.S. PATENT DOCUMENTS

2018/0221908 A1   8/2018   Enokihara et al.
2021/0025687 A1 * 1/2021   Ichikawa ............... G01B 7/107

FOREIGN PATENT DOCUMENTS

| JP | 2000346635 A | 12/2000 |
| JP | 2011-043392 A | 3/2011 |
| JP | 2016-225034 A | 12/2016 |
| JP | 2016219343 A | 12/2016 |
| JP | 201837198 A | 3/2018 |
| JP | 2018129283 A | 8/2018 |
| JP | 2019773 A | 1/2019 |

* cited by examiner

*Primary Examiner* — Cynthia L Schaller
(74) *Attorney, Agent, or Firm* — HAUPTMAN HAM, LLP

(57) ABSTRACT

According to the present disclosure, an electrode having an electrode mixture layer with a desired film thickness can be stably produced. A producing method disclosed herein includes detecting the surface position of a mixture coated film by a first sensor; detecting the surface position of a second roll by a second sensor; detecting the film thickness of the mixture coated film based on detection results of the first sensor and the second sensor; and adjusting a relatively rotation speed of a third roll based on the film thickness. And, the detected positions of the first sensor and the second sensor in a circumferential direction of the second roll are substantially identical. Due to this method, the change in the film thickness of the electrode mixed layer of produced electrode can be suppressed.

4 Claims, 3 Drawing Sheets

METHOD FOR PRODUCING ELECTRODE

CROSS REFERENCE TO RELATED APPLICATIONS

This application claims the benefit of foreign priority to Japanese Patent Application No. 2021-031991, filed on Mar. 1, 2021, the entire contents of which are incorporated herein by reference.

BACKGROUND

1. Technical Field

The present disclosure relates to a method for producing an electrode.

2. Description of the Related Art

In recent years, secondary batteries such as lithium ion secondary batteries have been used for portable power sources for personal computers, mobile devices, etc., or vehicle driving power sources for battery electric vehicles (BEVs), hybrid electric vehicles (HEVs), plug-in hybrid electric vehicles (PHEVs), etc. An example of this type of secondary battery electrode is an electrode in which an electrode mixture layer is attached to the surface of a belt-shaped electrode current collector. An electrode having such a constitution is produced by, for example, a method including forming a mixture coated film by rolling an electrode material, a precursor of an electrode mixture layer, to form a mixture coated film, and compressedly bonding the mixture coated film to the surface of an electrode current collector.

An example of the method for producing an electrode mentioned above is disclosed in JP 2016-219343 A. In the production method disclosed in this document, an electrode production apparatus provided with three rolls is used. Specifically, an electrode material is rolled between a first roll and a second roll to form a mixture coated film. Next, the formed mixture coated film is attached to the surface of the second roll and transported. In this electrode production apparatus, a third roll for transporting an electrode current collector is adjacent to a second roll, and therefore, a mixture coated film transported to the second roll and an electrode current collector transported by the third roll are compressedly bonded between the second roll and the third roll.

In order to stably produce an electrode with high quality in the above-mentioned production method, a mixture coated film (an electrode mixture layer) is required to have a film thickness with reduced variation. Therefore, feedback control for adjusting the production condition while detecting elements that affect the film thickness of a mixture coated film may be adopted in this type of production method. For example, in JP 2016-219343 A, the speed ratio of the rotation speed of a second roll and the transporting speed of an electrode current collector are changed based on the gap width between the first roll and the second roll. In JP 2018-37198 A, the speed ratio of a second roll and a third roll are controlled based on the thickness of a mixture coated film after rolling.

SUMMARY

However, in actual production, the variation of the film thickness may occur in an electrode mixture layer of an electrode after production even though the conventional production method is adopted. The present disclosure is proposed to solve such a problem and has an object to provide a production method capable of stably producing an electrode provided with an electrode mixture layer with a desired film thickness.

The present inventor has made various studies to solve the above problem, and as a result, reveals the cause of the film thickness variation of an electrode mixture layer occurred in a conventional production method. Specifically, the second roll of the above production method is used for two types of pressing processing including the rolling of an electrode material and the compression bonding of mixture coated film. Therefore, very large stress is applied to the second roll. This stress may cause the deformation or shaft misalignment of the second roll, which leads to the misalignment of the transported position of the mixture coated film after rolling. If the misalignment of this transported position is reflected on the measurement of the film thickness of a mixture coated film by a sensor, inappropriate feedback control based on false detection may be executed. For example, when the second roll deforms in the direction apart from a sensor, the film thickness of a mixture coated film is determined as decreased even though the film thickness of the mixture coated film is appropriate. In this case, control for increasing the film thickness of the mixture coated film is executed. Meanwhile, the film thickness of a mixture coated film is determined as increased when the second roll deforms in the direction closer to a sensor. In this case, control for decreasing the film thickness of the mixture coated film is executed. The present inventor considered that feedback control based on false film thickness detection might cause the film thickness variation of an electrode mixture layer.

The method for producing an electrode disclosed herein has been invented based on the above findings. The production method includes rolling an electrode material between a rotating first roll and a rotating second roll to form a mixture coated film, attaching the mixture coated film to the second roll and transporting the mixture coated film, guiding a long belt-shaped electrode current collector by a rotating third roll and transporting the electrode current collector; and passing the mixture coated film and the electrode current collector between the second roll and the third roll to compressedly bond the mixture coated film to the surface of the electrode current collector. Then, a production method disclosed herein includes detecting the surface position of the mixture coated film attached to the second roll by a first sensor; detecting the surface position of the second roll by a second sensor; detecting the film thickness of the mixture coated film based on the difference between the detection result of the first sensor and the detection result of the second sensor; and adjusting the ratio of the rotation speed of the third roll relative to the rotation speed of the second roll based on the film thickness of the mixture coated film. In a production method disclosed herein, the detection position of the first sensor and the detection position of the second sensor in a circumferential direction of the second roll are substantially identical.

The production method of the above constitution uses a first sensor configured to detect a surface position of a mixture coated film attached to the second roll and a second sensor configured to detect the surface position of the second roll. The detected positions of the first sensor and the second sensor in a circumferential direction of the second roll are substantially identical. A precise film thickness of a mixture coated film can be detected by calculating the difference of the detection results of the first sensor and the second sensor even when the misalignment of the transported portions due to the deformation of the second roll or the like occurs. Accordingly, the production method of the above constitution enables the execution of feedback control based on a precise film thickness of a mixture coated film, and therefore, enables stable production of electrodes provided with an electrode mixture layer with a desired film thickness.

In one preferred embodiment of the production method disclosed herein, the difference between the detection position of the first sensor and the detection position of the second sensor in the circumferential direction of the second roll is 15° or less. Due to this constitution, the film thickness of a mixture coated film attached to the second roll can be more precisely detected.

In one preferred embodiment of the production method disclosed herein, the second roll comprises a rotatably supported rotary shaft, and a tubular outer cylinder to which the mixture coated film is attached. The second sensor is configured to detect the surface position of the tubular outer cylinder. Due to this constitution, the film thickness of the mixture coated film can be precisely detected even when the transported position of the mixture coated film is misaligned due to thermal expansion of the tubular outer cylinder of the second roll.

In a preferred mode of the production method disclosed herein, the electrode material is a wet granulated body. The film thickness of an electrode mixture layer formed using such a wet granulated body easily varies depending on the rotation speed ratio between the second roll and the third roll. Thus, the technique disclosed herein can be more suitably applied to such an electrode mixture layer.

DETAILED DESCRIPTION

Figure 1:
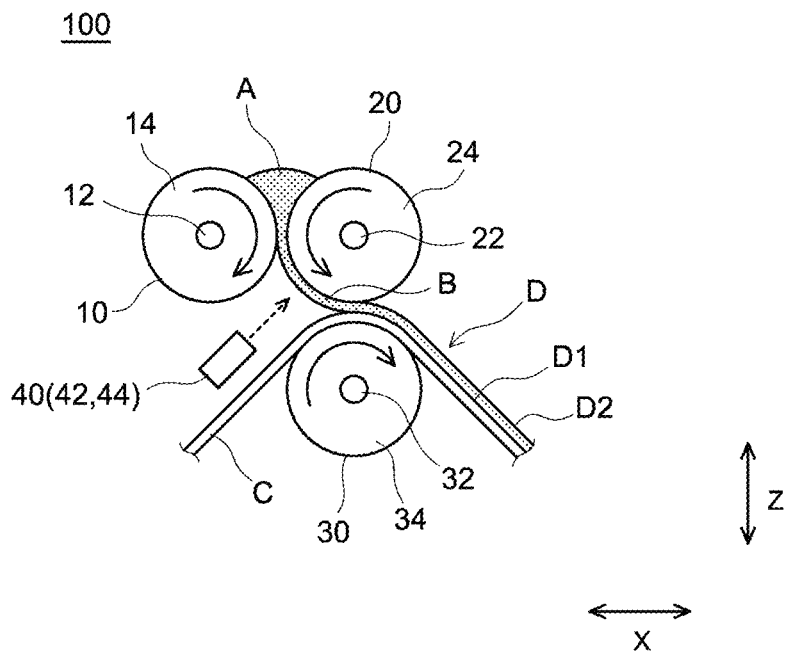
FIG. 1 is a side view explaining an electrode production apparatus used in a method for producing an electrode according to one embodiment.

Hereinafter, one embodiment of the technique disclosed herein is described with reference to the drawings. Matters other than those specifically mentioned in the present description but necessary for implementing the technique disclosed herein (for example, materials of electrodes and the like) may be recognized as design matters for a person skilled in the art based on conventional techniques in the art. The technique disclosed herein can be implemented based on the content disclosed in the present description and a common general technical knowledge in the art.

In the drawings referred to in the explanation below, members and sites exhibiting the same effect are assigned with the same numerals or symbols. The dimensional relationships (lengths, widths, thicknesses, etc.) in each figure do not reflect actual dimensional relationships. The symbol X represents the "width direction", the symbol Y represents the "depth direction", and the symbol Z represents the "height direction" in each figure referred to in the present description. These directions are defined for explanatory convenience and are not intended to limit the mode of installation of the electrode production apparatus described below.

First Embodiment

Figure 2:
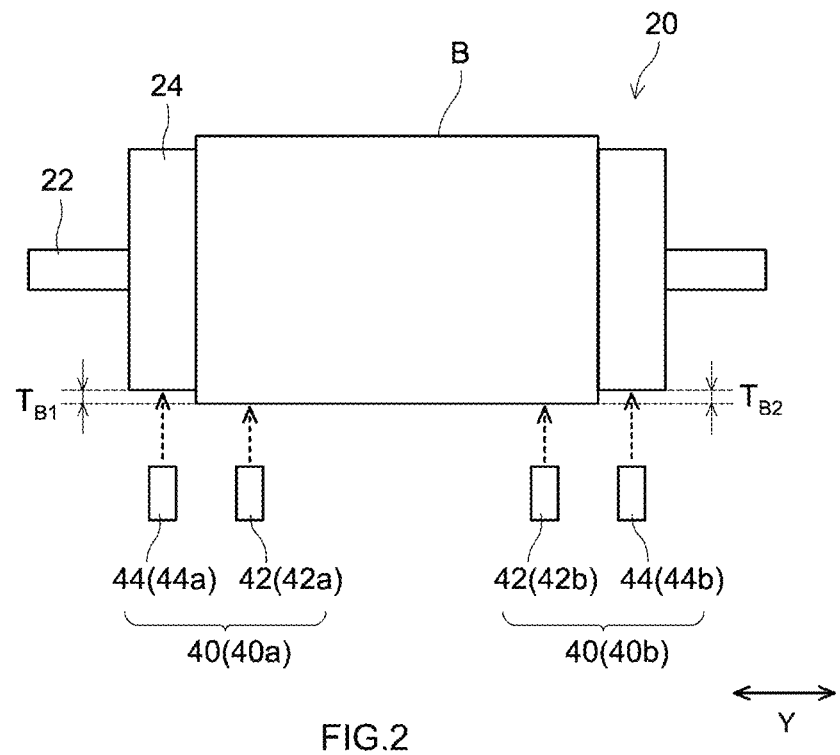
FIG. 2 is a front view explaining the positional relationship between a second roll and a film thickness sensor in FIG. 1.
Figure 3:
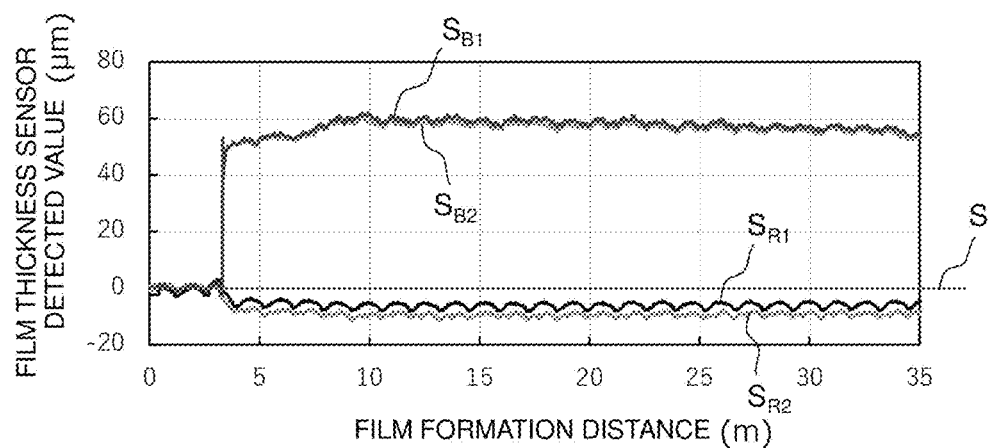
FIG. 3 is a graph illustrating an example of a detection result of the film thickness sensor illustrated in FIG. 2.
Figure 4:
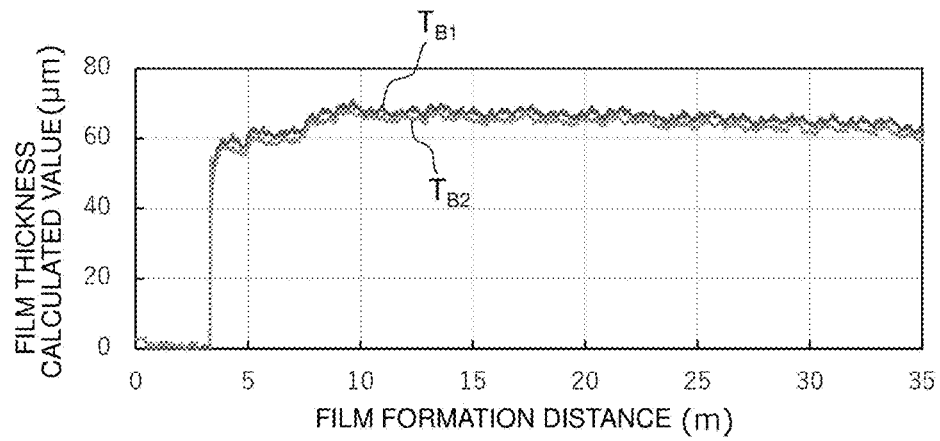
FIG. 4 is a graph illustrating an example of the film thickness of a mixture coated film calculated based on the detection result illustrated in FIG. 3.
Figure 5:
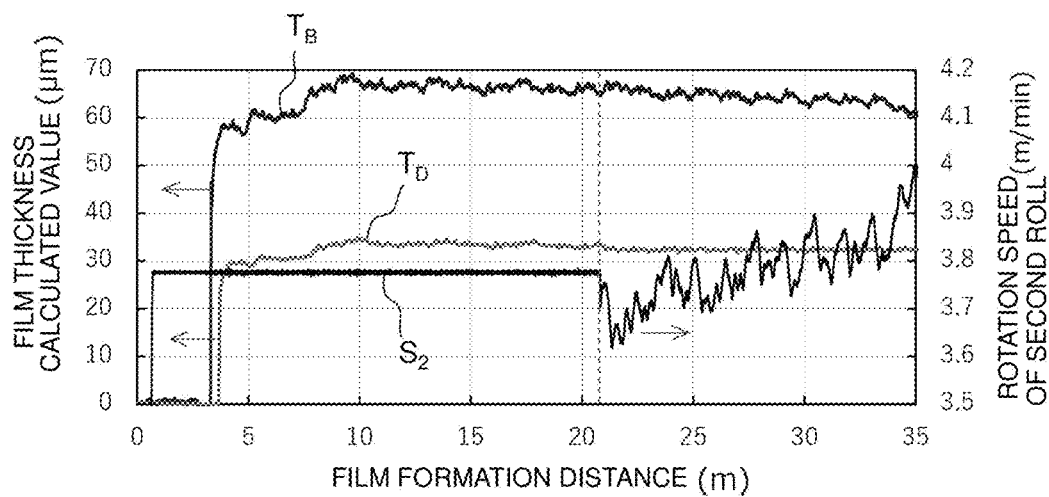
FIG. 5 is a graph illustrating an example of feedback control based on the film thickness of the mixture coated film illustrated in FIG. 4.

Hereinafter, one embodiment of the production method disclosed herein is described with reference to FIGS. 1 to 5. FIG. 1 is a side view explaining an electrode production apparatus used in a method for producing an electrode according to the present embodiment. FIG. 2 is a front view explaining the positional relationship between a second roll and a film thickness sensor in FIG. 1. FIG. 3 is a graph illustrating an example of a detection result of the film thickness sensor illustrated in FIG. 2. FIG. 4 is a graph illustrating an example of the film thickness of a mixture coated film calculated based on the detection result illustrated in FIG. 3. FIG. 5 is a graph illustrating an example of feedback control based on the film thickness of the mixture coated film illustrated in FIG. 4.

1. Constitution of Electrode Production Apparatus

The method for producing an electrode according to the present embodiment is a method for producing an electrode D in which an electrode mixture layer D2 is provided on the surface or a belt-shaped electrode current collector D1. Such a production method is implemented, for example, in an electrode production apparatus 100 illustrated in FIG. 1. This electrode production apparatus 100 includes a first roll 10, a second roll 20, a third roll 30, a film thickness sensor 40, and a controller (not illustrated). A specific constitution of the electrode production apparatus 100 is explained below.

First, in this electrode production apparatus 100, a first roll 10 and a second roll 20 are arranged along the width direction X. Specifically, the first roll 10 is provided with a rotatably supported rotary shaft 12 and a tubular outer cylinder 14 disposed concentrically outside the rotary shaft 12. As with the first roll 10, the second roll 20 is provided with a rotatably supported rotary shaft 22 and a tubular outer cylinder 24 disposed concentrically outside the rotary shaft 22. Then, the first roll 10 and the second roll 20 are arranged such that the respective rotary shafts 12 and 22 extend along the depth direction (the direction perpendicular to the paper surface of FIG. 1). That is, the first roll 10 and the second roll 20 are disposed such that the rotary shafts 12 and 22 extend substantially parallel. The first roll 10 and the second roll 20 are adjacent to each other such that a predetermined clearance (gap) should be formed between tubular outer cylinders 14 and 24. The rotary shaft 12 of the first roll 10 and the rotary shaft 22 of the second roll 20 are provided with driving mechanisms (not illustrated) attached thereto and, as illustrated in FIG. 1, are configured such that the rolls rotate in the mutually opposite directions. Although the details will be described later, the mixture coated film B is formed by supplying an electrode material A into the clearance between the first roll 10 and the second roll 20 and rolling the electrode material A. Then, the rolled mixture coated film B is transported in a state attached to the surface of the tubular outer cylinder 14 of the second roll 20.

Next, in this electrode production apparatus 100, the second roll 20 and the third roll 30 are arranged along the height direction Z. As with the first roll 10 and the second roll 20, the third roll 30 is also provided with a rotatably supported rotary shaft 32 and a tubular outer cylinder 34 disposed concentrically outside the rotary shaft 32. The third roll 30 guides and transports an electrode current collector C, which is a long belt-shaped metal foil. The second roll 20 and the third roll 30 are disposed such that the rotary shafts 22 and 32 extend substantially parallel, and clearance is formed between the tubular outer cylinders 24 and 34. Then, a mixture coated film B attached to the second roll 20 and the electrode current collector C transported by the third roll 30 are supplied between the second roll 20 and the third roll 30. The electrode current collector C and the mixture coated film B are compressedly bonded in this manner to produce an electrode D in which the electrode mixture layer D2 is attached to the surface of the electrode current collector D1. Note that, as with the first roll 10 and the second roll 20 mentioned above, the third roll 30 is a driving roll provided with a driving mechanism attached to the rotary shaft 32.

This electrode production apparatus 100 include a film thickness sensor 40 configured to detect the film thickness of a mixture coated film B attached to the second roll 20. Although details will be described below, the film thickness sensor 40 used in the production method according to the present embodiment is provided with a first sensor 42 configured to detect the surface position of a mixture coated film B attached to the second roll 20 and a second sensor 44 configured to detect the surface position of the second roll 20, as illustrated in FIG. 2. The first sensor 42 detects the surface positions $S_{B1}$ and $S_{B2}$ of the mixture coated film B relative to the preset standard position S (see FIG. 3). Meanwhile, the second sensor 44 detects the surface positions $S_{R1}$ and $S_{R2}$ of the second roll 20 relative to the preset standard position S. The information detected by these film thickness sensors 40 is sent to the controller (not illustrated).

The controller controls the operations of the first roll 10, the second roll 20, and the third roll 30. For example, the controller is provided with a ROM (Read Only Memory) storing a program for controlling the operations of rolls, a CPU (Central Processing Unit) that can execute the program, and a RAM (random access memory) for temporarily storing data. This controller receives the input of various types of information such as the current rotation speed of each roll, in addition to the detected results of the film thickness sensors 40. Based on this information, the controller controls the rotation speeds of the first roll 10, the second roll 20, and the third roll 30. Note that the controller may have functions, such as a function of adjusting the clearance between rolls by moving the rotary shafts 12, 22, and 32 of the rolls.

2. Method for Producing Electrode

Next, the method for producing an electrode using an electrode production apparatus 100 of the above constitution is described. This production method includes a rolling step (a), a coated film transportation step (b), a current collector transportation step (c), and a compression bonding step (d).

(a) Rolling Step

In the present step, an electrode material A is supplied between the rotating first roll 10 and the rotating second roll 20. As stated above, the first roll 10 and the second roll 20 rotate in the mutually opposite directions, and therefore, the electrode material A is carried to the clearance between the first roll 10 and the second roll 20. Then, a mixture coated film B is formed by rolling the electrode material A at the clearance between the first roll 10 and the rotating second roll 20. Note that the clearance between the first roll 10 and the second roll 20 is appropriately adjusted in consideration of the components and forms of the electrode material A so that the mixture coated film B with a desired film thickness can be formed. Such an electrode material A is a precursor of the electrode mixture layer D2 and is a material containing an electrode active material as a major component. The electrode material A may contain various types of additives, such as a binder, a thickener, or a conductive material, in addition to an electrode active material. Note that the components of the electrode material A may be appropriately selected and used among components that may be used in conventional known secondary batteries depending on the types of secondary batteries and does not limit the technique disclosed herein. Thus, the specific explanation about components of the electrode material A is omitted. Note that the term "secondary battery" in the present description refers to a power storage device in general that causes a discharging and charging reaction by charge carriers moving between a pair of electrodes (positive and negative electrodes) via electrolytes. Such secondary batteries encompass a so-called storage battery such as a lithium ion secondary battery, a nickel-hydrogen battery, and a nickel-cadmium battery, and a capacitor such as an electric double-layer capacitor.

The form of the electrode material A is not particularly restricted and may be any form of paste, slurry, powder, and a granulated body. The wet granulated body among the above electrode material A is a granulated body obtained by adding a small amount (for example, 10% by mass or more and 30% by mass or less) of a solvent to solid contents containing an electrode active material, and shaping the resultant mixture. A mixture coated film B obtained by rolling such a wet granulated body is likely to show the variation of the film thickness after rolling relatively frequently, and therefore, the effect of the control of the film thickness by adjusting the rotation speed ratio ($S_3/S_2$) between the second roll 20 and the third roll 30, which will be described later, tends to be larger. For this reason, the technique disclosed herein is particularly suitably used in a production method using a wet granulated body as the electrode material A. The wet granulated body has an advantage that the disproportion of the electrode mixture layer D2 due to migration is hardly caused. Note that the wet granulated body is preferably smaller than the clearance (rolling gap $G_1$ between the first roll 10 and the second roll 20. For example, the particle size of the wet granulated body may be about several tens of micrometers (for example, 20 μm or larger and 30 μm or smaller).

(b) Coated Film Transportation Step

In this step, the mixture coated film B is attached to the second roll 20 and transported. In the present step, a mixture coated film B rolled between the first roll 10 and the second roll 20 needs to be attached to the tubular outer cylinder 24 of the second roll 20. Means for attaching the mixture coated film B to the second roll 20 selectively in this manner is not particularly restricted, and conventional known means may be adopted without any particular restrictions. An example thereof is means for increasing the rotation speed of the second roll 20 to be greater than the rotation speed of the first roll 10. Due to this means, a mixture coated film B after rolling can be attached to the second roll 20, rotating at a relatively faster rotation speed. Alternatively, means for applying the surface treatment for improving the adhesive property of the mixture coated film B to the tubular outer cylinder 24 of the second roll 20 may be adopted. A mixture coated film B attached to the tubular outer cylinder 24 of the second roll 20 is transported to the clearance between the second roll 20 and the third roll 30 with the rotation of the second roll 20.

(c) Current Collector Transportation Step

In the present step, the rotating third roll 30 transports the electrode current collector C. The electrode current collector C is a long belt-shaped metal foil. The electrode current collector C may be appropriately selected among appropriate metal foils depending on the type of a secondary battery. When a positive electrode of a lithium ion secondary battery is produced, an aluminum foil is preferably used as the electrode current collector C. When a negative electrode is produced, a copper foil is preferably used as the electrode current collector C. The thickness of the electrode current collector C is also not particularly restricted because the thickness can be appropriately changed according to the constitution of a target battery. As an example, the thickness of the electrode current collector C is 5 μm or larger and 35 μm or smaller, or 7 μm or larger and 20 μm or smaller.

(d) Compression Bonding Step

In the present step, the mixture coated film B and the electrode current collector C are passed between the second roll 20 and the third roll 30. The electrode current collector C and the mixture coated film B are compressedly bonded in this step, and therefore, an electrode D in which the electrode mixture layer D2 is attached to the surface of the electrode current collector D1 can be produced. In the present step, it is preferred to implement various means for compressedly bonding the mixture coated film B attached to the surface of the second roll 20 to the electrode current collector C. For example, the rotation speed of the third roll 30 is increased to be greater than the rotation speed of the second roll 20, and the clearance between the second roll 20 and the third roll 30 is set to be lower than a certain degree. Due to this means, the mixture coated film B can be transferred from the second roll 20 to the electrode current collector C.

Note that the ratio ($S_3/S_2$) of the rotation speed $S_3$ of the third roll 30 relative to the rotation speed $S_2$ of the second roll 20 in the present step affects the thickness of the electrode mixture layer D2 of the electrode D after production. For example, when the $S_3/S_2$ becomes greater, the mixture coated film B is compressedly bonded to the electrode current collector C while being stretched between the second roll 20 and the third roll 30. As a result, the film thickness of the electrode mixture layer D2 after production tends to be thinner. In other words, when the $S_3/S_2$ becomes smaller, the mixture coated film B is compressedly bonded to the electrode current collector C while being stretched not so greatly. As a result, the film thickness of the electrode mixture layer D2 after production tends to be thicker.

(e) Feedback Control

In the production method according to the present embodiment, the film thickness of the mixture coated film B attached to the second roll 20 is detected by the film thickness sensor 40. Then, feedback control for adjusting the $S_3/S_2$ based on the detection result of the film thickness sensor 40 and making the film thickness of the electrode mixture layer D2 uniform is executed. Such feedback control includes a coated film surface detection step (1), a roll surface detection step (2), a film thickness detection step (3), and a speed adjustment step (4). The steps are each explained below.

(1) Coated Film Surface Detection Step

In the present step, the surface position of the mixture coated film B transported while attached to the second roll 20 is detected by the first sensor 42. As illustrated in FIG. 2, in the production method according to the present embodiment, a pair of film thickness sensors 40a and 40b are disposed at both edges in the depth direction Y, and the film thickness sensors 40a and 40b are provided with first sensors 42a and 42b, respectively. Then, one first sensor 42a is directed toward one side edge (left side in FIG. 2) of the mixture coated film B in the depth direction Y and detects the surface position $S_{B1}$ of the left side edge of the mixture coated film B relative to the predetermined standard position S (see FIG. 3). Meanwhile, the other first sensor 42b is directed toward the other side edge (right side in FIG. 2) of the mixture coated film B in the depth direction Y and detects the surface position $S_{B2}$ of the right side edge of the mixture coated film B relative to the standard position S (see FIG. 3). Note that the standard position S in the present step may be set to any position without any particular restrictions. For example, in FIG. 3, the surface position of the tubular outer cylinder 24 of the second roll 20 before starting the rolling step (a) (that is, the surface position of the tubular outer cylinder 24 when the mixture coated film B is not attached) is set as the standard position S.

(2) Roll Surface Detection Step

In the present step, the surface position of the second roll 20 is detected by the second sensor 44. As with the first sensors 42, the second sensors 44 are disposed in a pair of film thickness sensors 40a and 40b. Then, one second sensor 44a is directed toward the left side edge of the tubular outer cylinder 24 of the second roll 20 and detects the surface position $S_{R1}$ of the left side edge of the tubular outer cylinder 24 relative to the predetermined standard position S (see FIG. 3). Meanwhile, the other second sensor 44b is directed toward the right side edge of the tubular outer cylinder 24 of the second roll 20 and detects the surface position $S_{B2}$ of the right side edge of the tubular outer cylinder 24 relative to the standard position S (see FIG. 3). Note that the standard position S in the second sensor 44 is preferably set to the same position as the standard position S of the first sensor 42. Due to this constitution, the film thicknesses $T_{B1}$ and $T_{B2}$ (see FIG. 4) of the mixture coated film B can be easily calculated in the film thickness detection step (3), which will be described below.

Here, in the production method according to the present embodiment, the detection position of the first sensor 42 and the detection position of the second sensor 44 in the circumferential direction of the second roll 20 are required to be substantially identical. When the detection positions of the first sensor 42 and the second sensor 44 in the circumferential direction are too far apart from each other, errors due to the deformation of the second roll 20 greatly differ between the first sensor 42 and the second sensor 44, and precise detection of the film thicknesses $T_{B1}$ and $T_{B2}$ of the mixture coated film B becomes difficult. The difference between the detection positions of the first sensor and the second sensor in the circumferential direction is preferably 15° or less, more preferably 10° or less, further preferably 5° or less. For example, as illustrated in FIG. 2, the first sensor 42 and the second sensor 44 may be disposed so as to detect the same position in the circumferential direction of the second roll 20. As such, the film thicknesses $T_{B1}$ and $T_{B2}$ of the mixture coated film B can be particularly precisely detected by setting the difference of the detection positions of the first sensor 42 and the second sensor 44 to 0°.

(3) Film Thickness Detection Step

In this step, the film thicknesses $T_{B1}$ and $T_{B2}$ of the mixture coated film B are detected based on the difference between the detection results of the first sensors 42a and 42b and the detection results of the second sensors 44a and 44b. Due to this step, a precise film thickness of the mixture coated film B can be detected even when the misalignment of the transported positions of the mixture coated film B due to the deformation of the second roll 20 or the like. For example, in the graph illustrated in FIG. 3, the surface positions $S_{R1}$ and $S_{R2}$ of the second roll 20, detected by the second sensors 44a and 44b, are shifted to the minus side relative to the standard position S at the timing when the rolling of the electrode material A is started and the surface positions $S_{B1}$ and $S_{B2}$ of the mixture coated film B are detected by the corresponding first sensors 42a and 42b. The reason for this phenomenon is understood as that the shaft of the second roll 20 is misaligned by the stress when the electrode material A is rolled. In contrast, in the present embodiment, the difference between the surface position of the mixture coated film B and the surface position of the second roll 20 is determined, and therefore, the film thickness of the mixture coated film B can be precisely detected. Specifically, in the present embodiment, the difference between the surface position $S_{B1}$ of the mixture coated film B, detected by the left side first sensor 42a, and the surface position $S_{R1}$ of the second roll 20, detected by the left side second sensor 44a, is detected. Due to this detection, the film thickness $T_{B1}$ at the left side edge of the mixture coated film B (see FIGS. 2 and 4) can be precisely detected. Furthermore, in the present embodiment, as with the left side in the depth direction Y, the difference between the surface position $S_{B2}$ of the mixture coated film B, detected by the first sensor 42b, and the surface position $S_{R2}$ of the second roll 20, detected by the second sensor 44b, is also detected at the right side. Due to this detection, the film thickness $T_{B2}$ at the right side edge of the mixture coated film B can be precisely detected. Furthermore, in the present embodiment, the average $((T_{B1}+T_{B2})/2)$ of the film thickness $T_{B1}$ at the left side edge of the mixture coated film B and the film thickness $T_{B2}$ at the right side edge is calculated, and this average is regarded as the average film thickness $T_B$ (see FIG. 5) of the mixture coated film B. Due to this calculation, it is possible to prevent the variation of the film thickness in the depth direction Y from greatly affecting the feedback control, and therefore, the formation of an electrode mixture layer D2 with a more highly uniform film thickness can be facilitated.

(4) Speed Adjustment Step

In this step, the ratio $(S_3/S_2)$ of the rotation speed $S_3$ of the third roll 30 relative to the rotation speed $S_2$ of the second roll 20 is adjusted based on the film thickness $T_B$ of the mixture coated film B, detected in the film thickness detection step (3). As discussed above, when the rotation speed ratio $S_3/S_2$ of the second roll 20 and the third roll 30 increases, the film thickness of the electrode mixture layer D2 becomes thinner, and the ratio decreases, the film thickness of the electrode mixture layer D2 becomes thicker. Thus, in the production method according to the present embodiment, the rotation speed ratio $S_3/S_2$ of the second roll 20 and the third roll 30 is increased in order to suppress the increase of the film thickness $T_B$ of the mixture coated film B when a tendency for the film thickness $T_B$ of the mixture coated film B to increase is observed. Meanwhile, when a tendency for the film thickness $T_B$ of the mixture coated film B to decrease is observed, the rotation speed ratio $S_3/S_2$ of the second roll 20 and the third roll 30 is decreased in order to increase the film thickness $T_B$ of the mixture coated film B. Electrodes D provided with electrode mixture layers D2 with desired film thicknesses can be stably produced by appropriately executing such feedback control based on the film thickness $T_B$ of mixture coated films B.

An example of feedback in the speed adjustment step will be described in detail with reference to FIG. 5. In an example illustrated in FIG. 5, the roll speed ratio $S_3/S_2$ of the second roll 20 and the third roll 30 is controlled by adjusting the rotation speed $S_2$ of the second roll 20 while the rotation speed $S_3$ of the third roll 30 is kept constant. Furthermore, in the example illustrated in FIG. 5, the rotation speed $S_2$ of the second roll 20 (that is, $S_3/S_2$) is kept constant until the film formation distance reaches 21 m, and the feedback control based on the film thickness $T_B$ of the mixture coated film B is started at and after 21 m. Then, during a period in which the rotation speed $S_2$ of the second roll 20 is kept constant, it is observed that the film thickness $T_D$ of the electrode mixture layer D2 of the electrode D after production varies so as to follow the variation of the film thickness $T_B$ of the mixture coated film B. Meanwhile, it is observed that the variation of the film thickness $T_D$ of the electrode mixture layer D2 of the electrode D is suppressed by starting the feedback control and adjusting the rotation speed $S_2$ of the second roll 20 based on the variation of the film thickness $T_B$ of the mixture coated film B.

As stated above, the film thickness of the mixture coated film B is detected based on the difference between the detection results of the first sensor 42 and the second sensor 44 according to the present embodiment, and therefore, the film thickness of the mixture coated film B can be precisely detected without being affected by the misalignment of the transported portions of the mixture coated film B due to the deformation of the second roll 20 or the like. Furthermore, since feedback control for adjusting the rotation speed ratio $S_3/S_2$ of the second roll 20 and the third roll 30 based on this precise film thickness of the mixture coated film B is executed, an electrode D provided with an electrode mixture layer D2 with a desired film thickness can be stably produced.

The production method disclosed herein may be widely used in the production of the electrode D with various dimensions. For example, according to the production method disclosed herein, an electrode D in which the film thickness of the electrode mixture layer D2 is 1 µm or larger and 1000 µm or smaller can be produced. However, the production method disclosed herein can be particularly preferably used in the production of the electrode D provided with the electrode mixture layer D2 with a film thickness within the range of 10 µm or more and 100 µm or less. In producing such an electrode D, the film thickness of the electrode mixture layer D2 is required to be controlled with an accuracy of plus or minus several micrometers or less. Therefore, even though any infinitesimal deformation or shaft misalignment that cannot be observed by the eye occurs on the second roll 20, the quality of the electrode D after production is greatly affected. In contrast, in the production method disclosed herein, deformation and shaft misalignment at a level of several micrometers or less can be precisely measured, and a precise thickness of the mixture coated film B excluding the misalignment of the transported position due to the deformation of the second roll 20 or the like can be detected. For this reason, the production method disclosed herein can stably form the electrode mixture layer D2 with a desired film thickness even in the production of the electrode D provided with an electrode mixture layer D2 with a thinner film thickness.

Other Embodiments

As stated above, one embodiment of the technique disclosed herein is described. Note that the embodiment mentioned above indicates an example in which the technique disclosed herein is applied and is not intended to limit the technique disclosed herein. Now, other embodiments of the technique disclosed herein are described below.

(1) Number of Sensors to be Installed

In the first embodiment, a pair of film thickness sensors 40a and 40b are installed at both edges in the depth direction Y. However, the production method disclosed herein is acceptable as long as a film thickness sensor including a first sensor and a second sensor is used. Thus, the number of sensors to be installed is not particularly restricted. For example, one first sensor and one second sensor may be installed only at one edge in the depth direction. Even with such a configuration, a precise film thickness of a mixture coated film excluding the misalignment of the transported positions due to the deformation of the second roll or the like can be detected. Furthermore, the numbers of the first sensors and the second sensors to be installed do not have to be the same. For example, when three or more first sensors are installed and the surface positions of various sites on the mixture coated film are measured, the surface position of the mixture coated film can be more precisely detected. Meanwhile, since it is sufficient to install one second sensor at each edge in the depth direction, where the surface of the second roll (the tubular outer cylinder) is exposed, the number of the second sensors to be installed is preferably two in consideration of the cost of equipment or the like.

(2) Detection Target of Second Sensor

As described above, a detection target of the second sensor 44 in the first embodiment is the tubular outer cylinder 24 of the second roll 20. However, the measurement target of the second sensor is not particularly restricted as long as it is a second roll and may be a part of the second roll other than the tubular outer cylinder. For example, the second sensor may measure the surface position of the rotary shaft of the second roll. Even in this case, the deformation or shaft misalignment of the second roll can be detected by comparison with a preset standard position, and therefore, a precise film thickness of a mixture coated film excluding the influence due to the deformation of the second roll or the like can be detected. However, it is preferred to set the detection target of the second sensor 44 to the tubular outer cylinder 24, like the first embodiment, from the point of view to detect a more precise film thickness of a mixture coated film. Specifically, when the electrode material A is rolled at the clearance between the first roll 10 and the second roll 20, the first roll 10 and the second roll 20 are heated by the frictional heat from solid matters (the electrode active material and the like) in the electrode material A. Then, the tubular outer cylinder 24 of the second roll 20 may expand by the frictional heat at this rolling. Thus, a further precise film thickness of a mixture coated film can be detected by detecting the surface position of the tubular outer cylinder 24 by the second sensor 44 and excluding the influence of the thermal expansion on the tubular outer cylinder 24.

(3) Constitution of Electrode Production Apparatus

Figure 6:
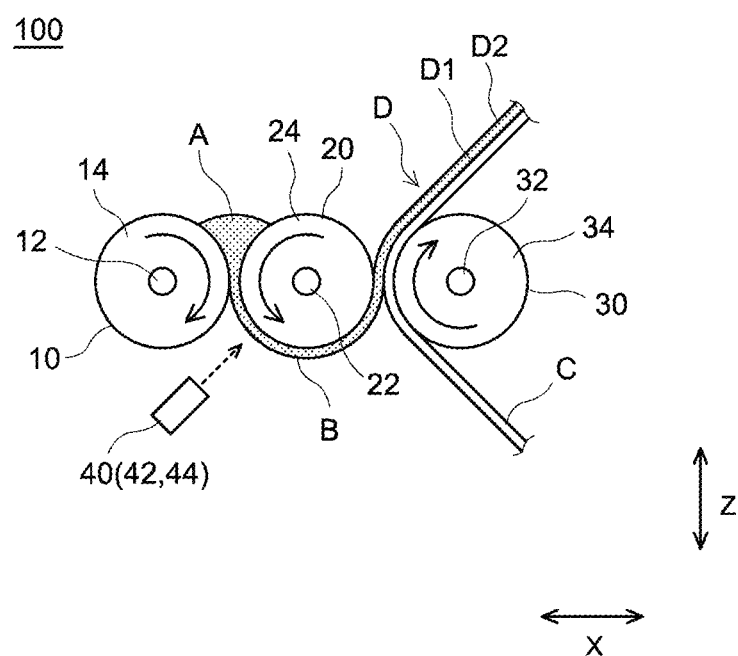
FIG. 6 is a side view explaining an electrode production apparatus used in a method for producing an electrode according to another embodiment.

The technique disclosed herein is applied to any production method using an electrode production apparatus including at least three rolls of the first to third rolls without any restrictions. For example, the first embodiment uses, as illustrated in FIG. 1, an electrode production apparatus 100 in which the first roll 10 and the second roll 20 are arranged along the width direction X, and the second roll 20 and the third roll 30 are arranged in the height direction Z. However, the structure of the electrode production apparatus is not limited to that illustrated in FIG. 1. For example, as illustrated in FIG. 6, an electrode production apparatus 100 in which all three rolls of the first roll 10, the second roll 20, and the third roll 30 are arranged along the width direction X may be used. Also in the electrode production apparatus 100 illustrated in this FIG. 6, the electrode D provided with the electrode mixture layer D2 with a desired film thickness can be stably produced by installing the first sensor 42 configured to detect the surface position of the mixture coated film B and the second sensor 44 configured to detect the surface position of the second roll 20 and adjusting the rotation speed ratio of the second roll 20 and the third roll 30 based on these detection results. The electrode production apparatus may include four or more rolls.

As illustrated in FIG. 2, the second roll 20 of the first embodiment is a cylindrical roll in which the outer diameters of the tubular outer cylinder 24 are identical in the axis direction. However, the shape of the second roll is not limited to the shape illustrated in FIG. 2. For example, a stepped roll may be used as the second roll, in which stepped parts with larger outer diameters than the central part are disposed at both edges in the shaft direction (depth direction). Due to this stepped roll, the misalignment of the transported position of the mixture coated film in the shaft direction can be prevented. When such a stepped roll is used, the second sensor may detect the position of the stepped part. Also in this case, deformation or shaft misalignment of the second roll can be detected by comparison of the surface position of the stepped parts with a preset standard position, and therefore, a precise film thickness of a mixture coated film excluding the influence due to the deformation of the second roll or the like can be detected. Alternatively, as another example of the shape of the second roll, a crown roll or the like, in which the outer diameter of the tubular outer cylinder at the central part in the axis direction is larger than the outer diameters of the tubular outer cylinder at both edges, can be mentioned. Even when such a crown roll is used, the deformation and the shaft misalignment of the second roll can be precisely detected based on the surface position at both edges by registering the roll shape in advance in the controller.

(4) Feedback Control

Next, as illustrated in FIG. 5, feedback control is executed in the first embodiment such that the rotation speed $S_2$ of the second roll 20 continuously changes following the variation of the film thickness $T_B$ of the mixture coated film B. However, the technique disclosed herein is acceptable as long as the rotation speed ratio of the second roll and the third roll is adjusted and is not limited to the control indicated in FIG. 5. For example, control may be executed such that an upper limit threshold and a lower limit threshold are set to the film thicknesses of a mixture coated film, detected by the first sensor and the second sensor, and when a film thickness exceeds the upper limit threshold or is lower than the lower limit threshold, the rotation speed of the second roll is changed steppedly. Note that it is preferred that the rotation speed ratio is continuously changed following the film thickness of the mixture coated film as in the first embodiment from the point of view of making the film thickness of the electrode mixture layer after production more uniform.

In a first embodiment, the rotation speed $S_3$ of the third roll 30 is fixed, and the rotation speed $S_2$ of the second roll 20 is adjusted in order to control the roll speed ratio ($S_3/S_2$). However, means of controlling the roll speed ratio ($S_3/S_2$) is not particularly restricted. For example, the rotation speed $S_2$ of the second roll 20 may be fixed, and the rotation speed $S_3$ of the third roll 30 may be adjusted. Alternatively, both rotation speeds $S_2$ and $S_3$ of the second roll 20 and the third roll 30 may be adjusted. However, it is more preferable to fix the rotation speed $S_3$ of the third roll 30 and adjust the rotation speed $S_2$ of the second roll 20, as in the first embodiment, from the point of view of making it easier to adjust the balance between the supply speed of the mixture coated film B by rolling the electrode material A and the compression bonding speed between the electrode current collector C and the mixture coated film B.

As described above, specific embodiments of the present disclosure are explained in detail, but these are mere examples and do not limit the scope of claims. The techniques recited in claims encompasses variations and modifications of specific embodiments mentioned by way of examples.

What is claimed is:

1. A method for producing an electrode, comprising:
rolling an electrode material between a rotating first roll and a rotating second roll to form a mixture coated film;
attaching the mixture coated film to the second roll and transporting the mixture coated film;
guiding a long belt-shaped electrode current collector by a rotating third roll and transporting the electrode current collector; and
passing the mixture coated film and the electrode current collector between the second roll and the third roll to compressedly bond the mixture coated film to a surface of the electrode current collector;
the method further comprising:
detecting a film thicknesses $T_{B1}$ of a left side of the mixture coated film between a surface position of a left side edge of the mixture coated film detected by a first sensor of the left side and a surface position of the left side edge of the second roll detected by a second sensor of the left side;
detecting a film thicknesses $T_{B2}$ of a right side of the mixture coated film between a surface position of a right side edge of the mixture coated film detected by a first sensor of the right side and a surface position of the right side edge of the second roll detected by a second sensor of the right side;
determining an average film thickness $T_B$ of the mixture coated film by calculating $(T_{B1}+T_{B2})/2$; and
adjusting a ratio of a rotation speed of the third roll relative to a rotation speed of the second roll based on the average film thickness $T_B$ of the mixture coated film, wherein
a detection position of the first sensor of the left side and the first sensor of the right side and a detection position of the second sensor of the left side and the second sensor of the right side in a circumferential direction of the second roll being maintained substantially identical.

2. The method for producing an electrode according to claim 1, wherein a difference between the detected position of the first sensor of the left side and the first sensor of the right side and the detected position of the second sensor of the left side and the second sensor of the right side in the circumferential direction of the second roll is 15° or less.

3. The method for producing an electrode according to claim 1, wherein the second roll comprises:
a rotatably supported rotary shaft; and
a tubular outer cylinder to which the mixture coated film is attached, wherein
the second sensor of the left side and the second sensor of the right side configured to detect a surface position of the tubular outer cylinder.

4. The production method according to claim 1, wherein the electrode material is a wet granulated body.

* * * * *